No. 704,288. Patented July 8, 1902.
A. G. ANDERSON.
BICYCLE.
(Application filed Nov. 27, 1899.)
(No Model.)
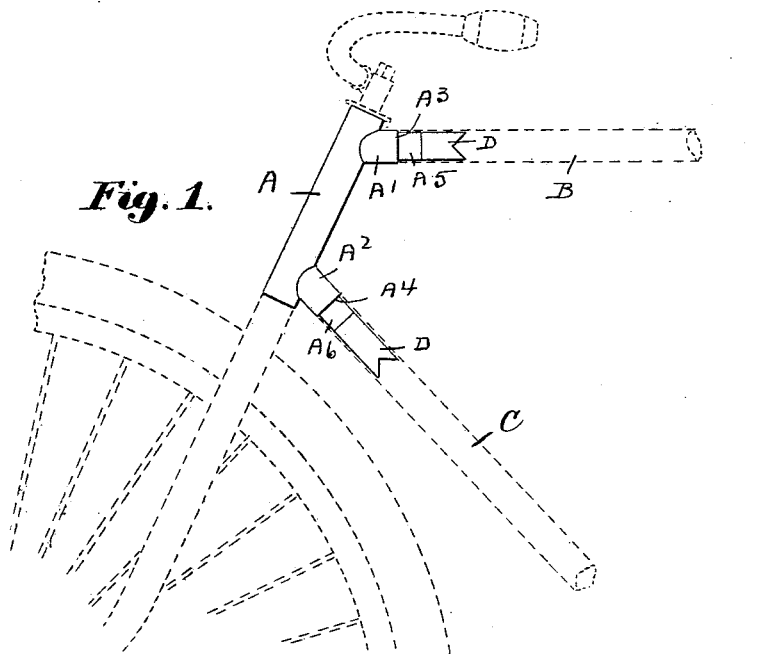
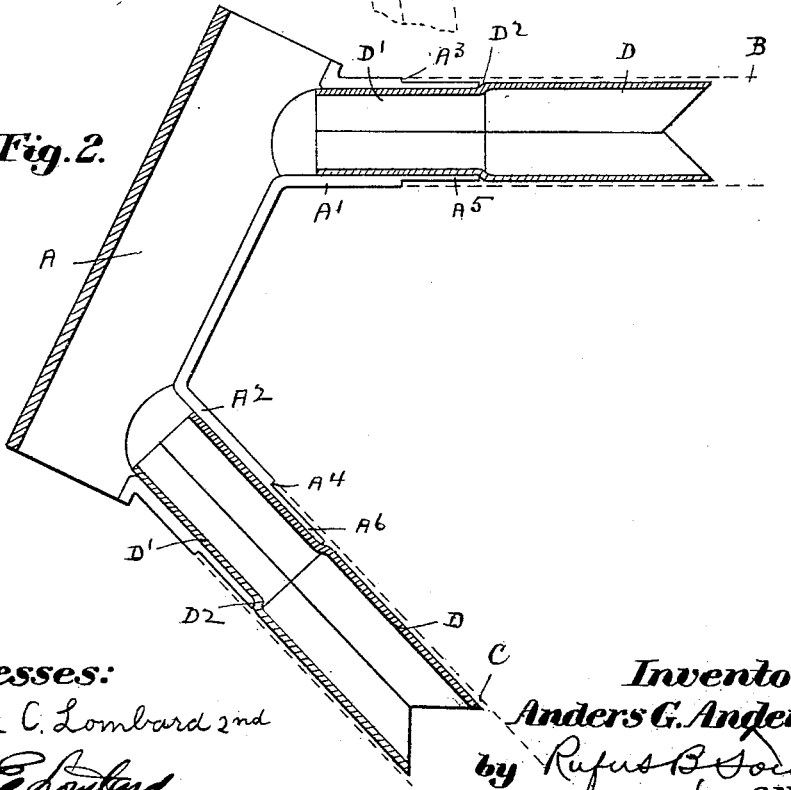
Witnesses:
Nathan C. Lombard 2nd
Walter E. Lombard
Inventor:
Anders G. Anderson,
by Rufus B. Fowler
Atty.

UNITED STATES PATENT OFFICE.

ANDERS G. ANDERSON, OF WORCESTER, MASSACHUSETTS, ASSIGNOR TO EDMUND CONVERSE, OF WORCESTER, MASSACHUSETTS.

BICYCLE.

SPECIFICATION forming part of Letters Patent No. 704,288, dated July 8, 1902.

Application filed November 27, 1899. Serial No. 738,398. (No model.)

*To all whom it may concern:*

Be it known that I, ANDERS G. ANDERSON, a citizen of the United States, residing at Worcester, in the county of Worcester and Commonwealth of Massachusetts, have invented a new and useful Improvement in Bicycles, of which the following is a specification, accompanied by drawings forming a part of the same, in which—

Figure 1 represents so much of a bicycle as is necessary to illustrate the character of my invention, and Fig. 2 is a central sectional view of the front post or steering-head tube.

Similar letters refer to similar parts in the different figures.

My invention relates to the framework of a bicycle, and particularly to the front post or steering-head tube, within which the front fork of the bicycle is journaled.

My invention consists in the novel construction of that portion of a bicycle-frame known as the "front post" or "steering-head tube," as hereinafter described, and pointed out in the annexed claims.

The steering-head tube embodying my invention, like those now in common use, comprises a tube forming the bearing of the steering-head and having two prongs to receive the struts of the frame.

That portion of a bicycle to which my invention relates has heretofore been made either of sheet metal stamped or shaped in a drop-press from a sheet-metal blank to form a tube with short prongs integral therewith to receive the strut of the frame or from a forged piece of steel bored out to form a tube. In constructing a bicycle with a sheet-metal steering-head tube it has been necessary to form flanges upon the ends of the struts in order to provide suitable surfaces for brazing the members of the frame together. The use of a forged piece for this part of the frame allows the ends of the prongs to be reduced in diameter, owing to the greater thickness of metal, thereby forming nipples to receive the ends of the struts and making what is known as a "flush joint." The use of a sheet-metal steering-head tube has the disadvantage of requiring an unsightly lap-joint, or one made by the flanged ends of the struts, in order to secure the requisite strength, and the use of a forged steering-head tube while permitting a flush joint increases the weight of the frame and cost of construction.

The object of my present invention is to provide a steering-head tube capable of incorporation in the frame of a bicycle by means of flush joints and reduce the weight and cost of construction of a forged joint.

Referring to the drawings, A denotes a front post or steering-head tube embodying my invention and provided with an upper prong A' to receive the end of the upper strut B and a lower prong $A^2$ to receive the end of the lower strut C. The tube A and prongs A' $A^2$ are integral and are formed from a single sheet-metal blank in the usual and well-known manner now employed in shaping this portion of a bicycle-frame. The sheet metal from which the tube A and prongs A' $A^2$ are constructed is sufficiently heavy to allow each of the prongs to be reduced in diameter at their ends and for about half their length by means of a hollow mill or by turning, forming shoulders $A^3$ $A^4$ equal to the thickness of the tubular struts B and C, which are slipped upon and brazed to the reduced ends $A^5$ and $A^6$ of the prongs. It is not practicable, however, to employ sheet metal of sufficient weight to form shoulders $A^3$ and $A^4$ necessary to make a flush joint and also leave sufficient metal at the reduced ends $A^5$ $A^6$ to form a joint of sufficient strength. I therefore reinforce the reduced ends of the prongs by inserting in each a reinforcing sheet-metal tube D, having its outer diameter equal to the inner diameter of the struts and adapted to be brazed thereto and having one end reduced at D' to fit the interior of the prong and extending its entire length and adapted to be brazed thereto. The end D' of the reinforcing-tube D is reduced by compressing the tube in the operation of forming it from a sheet-metal blank, thereby forming an exterior shoulder $D^2$, which abuts against the end of the prong. By inserting the reinforcing-tube D the entire length of the prong I increase the surface to be brazed between these two members of the frame and prevent the crystallization which is liable to occur adjacent to the shoulders $A^3$ and $A^4$ and resist the strain which would otherwise be exerted by the struts upon the reduced ends of the prongs by securing the struts to the surface of the reinforcing-tubes with the ends of the struts overlapping or covering the joint between the ends of the prongs and the shoulders $D^2$ of the reinforcing-tubes.

I am aware that it is not new to form a flush joint in bicycle-frames, nor is it new to reinforce the joint by the insertion of an interior tube, and I do not claim either of these features broadly. By my improved construction I render a sheet-metal seat-post tube substantially as strong as one made from a solid drop-forging, and I resist the longitudinal strains upon the frame by the joint resistance of both the abutting shoulders $A^3$ $A^4$ and the abutting shoulder $D^2$, thereby relieving the brazed joint between the outer tubes B and C and the inner braces D.

What I claim as my invention, and desire to secure by Letters Patent, is—

1. In a bicycle-frame, the combination of a tubular prong having its end reduced in thickness and forming a shoulder, an interior tube having one end inserted in the end of said tubular prong and having the diameter of its opposite end equal to the diameter of the reduced section of said prong and a tubular strut inclosing the enlarged end of said interior tube and the reduced section of said prong with the overlapping surfaces of said prong, interior tube and inclosing tubular strut brazed together, substantially as described.

2. In a bicycle-frame, the combination of a tubular member divided longitudinally at one side and having a projecting divided prong, the parts of which are located at opposite sides of the division of said longitudinal member and form together a complete prong, the outer portion of which prong is reduced forming an external shoulder, an interior tube secured in said prong and projecting beyond the same and a strut, or frame-tube, fitting over the projecting end of said interior tube and surrounding the reduced portion of said prong to hold the parts thereof together and abutting at its end against said external shoulder of the prong, whereby the external surfaces of the prong and the strut, or frame-tube, form a flush joint, substantially as described.

3. In a bicycle-frame, the combination with a tubular member divided longitudinally at one side and having projecting half-prongs located at opposite sides of the division and forming together a complete prong, the outer portion of said prong being reduced forming a shoulder near the end thereof, of an interior tube secured in said prong and projecting beyond the same, the outer wall of said interior tube being substantially flush with the outer face of the reduced portion of the prong and provided with a shoulder which abuts against the reduced end of the prong and a strut or frame-tube fitting over said interior tube and the reduced portion of said prong and abutting at its end against the shoulder of the prong, substantially as described.

Dated this the 16th day of October, 1899.

ANDERS G. ANDERSON.

Witnesses:
RUFUS B. FOWLER,
AVA T. MURPHY.